United States Patent
Schönenbach

(10) Patent No.: US 7,677,632 B2
(45) Date of Patent: Mar. 16, 2010

(54) ROOF CONSTRUCTION FOR MOTOR VEHICLES

(75) Inventor: Heinz Schönenbach, Remscheid (DE)

(73) Assignee: Parat Automotive Schonenbach GmbH + Co., KG, Remscheid (DE)

( * ) Notice: Subject to any disclaimer, the term of this patent is extended or adjusted under 35 U.S.C. 154(b) by 0 days.

(21) Appl. No.: 11/991,363

(22) PCT Filed: Aug. 7, 2006

(86) PCT No.: PCT/DE2006/001389

§ 371 (c)(1),
(2), (4) Date: Feb. 28, 2008

(87) PCT Pub. No.: WO2007/025502

PCT Pub. Date: Mar. 8, 2007

(65) Prior Publication Data

US 2009/0085381 A1     Apr. 2, 2009

(30) Foreign Application Priority Data

Sep. 2, 2005    (DE) ........................ 10 2005 042 017

(51) Int. Cl.
*B60J 7/08*         (2006.01)
(52) U.S. Cl. .................................. 296/107.06; 296/214
(58) Field of Classification Search .................. 296/108, 296/107.06, 214, 107.09, 107.11

See application file for complete search history.

(56) References Cited

U.S. PATENT DOCUMENTS

| | | | |
|---|---|---|---|
| 5,269,586 A | 12/1993 | Hahn et al. | 296/224 |
| 6,419,295 B1* | 7/2002 | Neubrand | 296/107.07 |
| 6,550,843 B2* | 4/2003 | Patelczyk | 296/118 |
| 6,666,502 B2* | 12/2003 | Kralik | 296/214 |
| 2002/0105206 A1* | 8/2002 | Neubrand | 296/107.07 |
| 2003/0057738 A1* | 3/2003 | Kralik | 296/214 |
| 2008/0122247 A1* | 5/2008 | Armbruster et al. | 296/107.09 |

FOREIGN PATENT DOCUMENTS

| | | |
|---|---|---|
| DE | 4031270 | 10/1991 |
| DE | 10242440 | 3/2004 |
| GB | 2267063 | 11/1993 |

* cited by examiner

*Primary Examiner*—Patricia L Engle
(74) *Attorney, Agent, or Firm*—Andrew Wilford

(57) ABSTRACT

A roof structure for motor vehicles has at least one roof panel attached to the body of the motor vehicle, a headliner, a linkage for shifting the roof panel from an out-of-service position into a use position, and at least one support element carrying a portion of the headliner for displacement between an out-of-service end position and a working end position. The headliner portion in the respective out-of-service end position covers a motor-vehicle portion and in the working position frees the motor-vehicle portion. The support element is pivotal to displace the portion about a pivot axis fixed relative to the roof panel.

41 Claims, 6 Drawing Sheets

ROOF CONSTRUCTION FOR MOTOR VEHICLES

CROSS REFERENCE TO RELATED APPLICATIONS

This application is the US national phase of PCT application PCT/DE2006/001389, filed 7 Aug. 2006, published 8 Mar. 2007 as WO2007/025502, and claiming the priority of German patent application 102005042017.6 itself filed 2 Sep. 2005, whose entire disclosures are herewith incorporated by reference.

FIELD OF THE INVENTION

The invention initially relates to a roof structure for motor vehicles comprising at least one roof panel attached to the body of the motor vehicle and having a headliner, the roof panel being shiftable from an out-of-service position into a use position by means of a linkage, at least one support element being provided that carries a portion of the headliner that can be displaced between an out-of-service position and a working position, the portion in the out-of-service position covering a part of the motor vehicle portion, particularly the linkage, and the headliner portion in the working position uncovering the motor-vehicle part.

BACKGROUND OF THE INVENTION

Such roof structures particularly may have multiple roof panels that particularly should also be very stable. In such case the roof structures are also called variable roofs. With the roof structure in the use position, it forms a fixed, rigid roof in the manner of a convertible-type vehicle. In this case, the roof is closed. If the roof panel is in its out-of-service position, the roof structure is typically accommodated, for example, in a rear end area of the motor vehicle, particularly in the trunk of the motor vehicle, folded in a compact manner, or collapsed. In this case, the convertible is open.

A linkage, which may be formed, for example, in the form of two cables that are arranged next to the motor-vehicle side walls, typically displaces the roof panel(s) automatically between the out-of-service position and the use position, normally driven by a motor. The linkage consists of a plurality of individual links, i.e. levers or arms that are connected to each other in a pivot joint.

One particular difficulty is the arrangement of an interior headliner that consists, for example, of a flexible cloth sheet and/or of a textile or the like. The headliner covers the bottom of the roof panel facing the interior such that the vehicle passengers are offered an appropriate visual appearance on one hand, and so that sound and temperature insulation is also achieved on the other hand. In this regard, the arrangement of portions of the headliner have proven problematic in the area of the linkage, since the links of the linkage can execute relatively large movements.

For this purpose a support element in the form of a section 31 of a displaceable guide tongue 32 is already known from DE 102 42 440 A1 by the applicant, on which a portion of the headliner is arranged. By displacing the guide tongue 32 the portion can be displaced between the out-of-service position, in which it covers the linkage, and a working position, in which it frees the linkage.

OBJECT OF THE INVENTION

Based on previously known roof structures, the object of the invention is to further develop a roof structure as described above such that a simple structure is possible.

SUMMARY OF THE INVENTION

The invention attains this object in that the support element pivots to displace the portion, and that the pivot axis is fixed relative to the roof panel.

The principle of the invention is essentially that instead of providing a support element that is displaceable by means of a cam assembly, a pivoting support element is provided that can be pivoted, i.e. tilted or folded, from an out-of-service position into a working position. To this end, the support element may have a large surface area, and can carry a similarly large portion of the material of the headliner with its large surface that is, for example laminated, for example, glued, onto the support element. The large surface of the support element is particularly advantageous, since a portion of the large surface area of the headliner can be displaced. The support element can, for example, based on the travel direction of the motor vehicle, extend along the entire length of the associated roof panel so that with a very small amount of required components a safe and permanently operating displacement movement of a large portion of the surface area of the headliner is enabled.

The support element formed as a hinge may be fixed directly to the roof panel, or may be arranged on a component that itself is attached to the roof panel. A fixed pivot axis on the roof panel side enables a constant and precise predetermined displacement movement of the support element.

While the displacement movement of the portion by means of link control known according to the prior art requires a relatively complicated structure, the support structure according to the invention can be formed in a simpler manner due to reverting to fewer extensive components, such as hinges. The displacement movement itself is minimally influenced by temperature deviations, dirt, or material wear due to the pivoting embodiment of the support element. While, for example, jamming and canting may occur in a link control, and certain maintenance or repair expenditures are also to be expected, maintenance in a pivoting embodiment of the support element is minor.

Finally, the possibility exists in a pivoting embodiment of the support element executing improved conversion of forces, since by means of the selection of the transfer point of a tension means, such as a linkage, cord, tension rod, spring element, or the like, relative to the pivot axis of the support element, different torques may be exerted upon the support element. On the other hand, a pivotal displacement of the support element may be also obtained, when necessary, by using only very short displacements of the tension means. This is particularly advantageous as opposed to the previously known sliding displacement of the portion, since for the complete displacement of the support element between its working position and its out-of-service position a predetermined displacement path was required at this location, which the tension means also had to run through.

Finally, in a pivoting embodiment of the support element, a particularly quick displacement of the support element from its out-of-service position into its working position may occur. Particularly in the case where links of the linkage execute large movements at the beginning of an opening movement of the roof structure, the support element may be quickly displaced with its portion from the out-of-service position covering the vehicle area into the working position releasing the vehicle area so that the support element quickly frees the movement path of the link, and does not adversely affect the movements of the links of the linkage.

The portion located in out-of-service position may cover the linkage, or another area of the vehicle, such as a C-column, or possibly also a B-column, or any other edge area of the roof panel, or an area of the body of the motor vehicle.

According to an advantageous embodiment of the invention, a section of the interior headliner is attached to the portion directly adjacent the support element, particularly on its side directed toward the center of the motor vehicle. This section of the interior headliner is preferably flexible so that, possibly by forming a fold, or by providing a folding axis, the support element can move back and forth between its two positions.

Typically, the entire headliner is flexible and can be stretched or tightened. Only the portion of the headliner that is laminated onto the support element is firmly attached in that area relative to the support element. The support element itself is advantageously provided by a harder, typically dimensionally stable part, such as a plastic shell part, on which the headliner is mounted so that overall a continuous headliner is formed across the interior of the roof panel.

In an advantageous embodiment of the invention, a portion of the headliner adjacent the support element may be carried on a second support element. In this case, two adjacent support elements that are essentially dimensionally stable may be provided, between which a foldable portion of the headliner may be arranged. The two support elements may, for example, be folded together on top of each other, in order to expose a vehicle area, or to be folded apart in order to cover the vehicle area.

According to an advantageous embodiment of the invention the support element is formed by a generally planar body. This enables an advantageous, very continuous formation of the headliner. The pivoting embodiment of the support element also enables in an advantageous manner that support elements having a very large surface may be provided that carry correspondingly large surface portions, and can be permanently displaced safely.

According to an advantageous embodiment of the invention the pivot angle of the support element is more than 60°. The optimum choice of this angle essentially depends on the requirements of the motor vehicle, the stroke of the link, and on the arrangement and alignment of the support element and its pivot axis. In certain cases it may suffice to pivot the support element only by a small pivoting angle of, for example, 60°, in order to free the vehicle area, or to cover the same. In other embodiments it is also advantageous to be able to pivot the support element by approximately 90° or more, in order to, for example, release the linkage completely.

In other applications it is advantageous, if the support element can be pivoted by nearly or about 180°, and can therefore be pivoted or folded, for example, on an adjacent section of the headliner, and can possibly even be placed on the section so that contact can possibly be made. This can enable a particularly stable and space-saving, compacted working position of the support element, or of the portion.

The pivot axis can extend, for example, essentially in the travel direction of the motor vehicle. As an alternative, it may also be that the pivot axis is oriented in the travel direction laterally tilted toward the front and upward, or possibly also slightly tilted toward the center of the motor vehicle off the longitudinal center axis of the motor vehicle. The alignment of the pivot axis essentially depends on the type and embodiment of the roof structure, and also on how many roof panels are provided, and how the displacement of the roof panels occurs between its respective out-of-service position and the use position.

Advantageously, a total of six pivoting support elements are provided in a roof structure, for example, consisting of three essentially dimensionally stable roof panels, i.e. each roof panel has two pivoting support elements each arranged essentially symmetrical to the longitudinal center axis of the motor vehicle.

According to another advantageous embodiment of the invention the support element is pretensioned toward one of the two possible positions by means of a spring. A tension means, such as a linkage, may also engage the support element. The tension means may convert movement of the roof panel pivoting the support element, such as when the tension means is fixed at one end on the support element, and is connected at its other end directly or indirectly to a link of the linkage. If the portion is in the out-of-service position with the roof structure closed, the linkage can exert tension on the tension means at the beginning of the opening movement of the roof, and, for example, initiate pivoting of the support element, whereby, after the support element has moved through a short pivoting path, the tension spring becomes active and can pivot the support element into its position corresponding to the working position of the portion. To this end it may also be provided that the spring element has a dead-center position with the portion in out-of-service position.

This invention is also based on a previously described, previously known roof structure.

This invention is based on the object of making the known roof structure simpler with regard to its structure at high functional safety.

The invention attains the object in that the first support element is pivotal for displacement of the portion, and can be pivoted between an extended position in which the material together with the portion of the headliner adjacent thereto form a large surface structure aligned essentially along a plane, and a folded-up position, in which the portion is folded up against the adjacent section.

The principle of the invention is essentially to make the support element pivotal. The support element can pivoted between an extended position and a folded-up position. In the extended position the support element is mounted such that the portion of the headliner attached to the support element, together with an adjacent section, presents a large surface. It extends in the extended position essentially along a plane, and can cover a motor-vehicle area, such as a C-column of the motor vehicle, over a large area. In the folded-up position of the support element, the portion provided on the support element is folded up toward the adjacent portion of the headliner. In this manner, it can assume a compact, space-saving working position.

It is possible with the solution according to the invention to quickly and safely displace large surface areas of the headliner toward a compact working position in which they do not extend into the movement paths of parts of the linkage and are stored safely. This also safely prevents the headliner from getting dirty by contact with elements of the linkage.

Especially when a C-column of a motor vehicle is to be equipped with a facing-type cover by means of the headliner, a particularly safely functioning structure can be achieved at simple structure means with the solution according to the invention. Slidable elements, which typically require link control, can be eliminated. Pivotal displacement of the support element can be effected by means of tension means, such as linkages, or the like that may engage, for example, at the first support element itself, or at the portion of the headliner directly adjacent to it.

The invention can be utilized in a particularly advantageous manner if a section of the headliner adjacent the portion is carried by a second support element. In this arrangement of two directly adjacent support elements, where a portion of a flexible headliner, a so-called fold, is arranged between the support elements, the pivoting axis for the displacement movement of the first support element can be in the area of the folded portion, and formed by same. The two support elements can tilt toward each other, i.e. fold together, very simply in this manner. In this regard the second support element can also form a stop for the first support element that will safely end the pivoting movement of the first support element.

The pivot axis can be aligned, for example, essentially perpendicular relative to the floor of the motor vehicle, or have at least one directional component that is positioned essentially perpendicular. Typically, the C-column of a motor vehicle of interest in this regard is slightly bent, and tilted laterally toward the top, in the travel direction of the motor vehicle toward the front. The pivot axis can be positioned essentially perpendicular to this bend of the C-column.

According to an advantageous embodiment of the invention the first support element can be pivoted by about 180°. In particular, the first support element can be pivoted relative to the second support element by about 180°.

The second support element can itself shift during the opening and/or closing movement of the roof panel. However, it is also possible that the second support element remains stationary during opening and/or closing relative to the roof panel.

Based on the roof structure described in DE 102 42 440 A1, the object of the invention is to further develop the known roof structure such that a simplified structure manner is possible.

The invention attains this object in that a control element is mounted on the link, having a control surface, and cooperating with tension means that can be displaced by movement of the link by means of a control cam contacting the control surface relative to the link.

The principle of the invention essentially is to displace a displaceable portion via a tension means, particularly a linkage, the contact point of the tension means being improved at the linkage. According to the invention it is proposed to connect the tension means to a control element that is mounted relative to a link in a displaceable manner on this link. In the simplest case the control element can move on the link with the aid of a link cam. The control element carries a control surface that can be contacted by a control cam. The control cam that, for example, can be formed by a rotating roller, is mounted on a part of the roof structure that can move relative to the link. For example, the control cam can be fixed directly to the roof panel.

Due to the shifting of the roof panel from its out-of-service position into its use position, and/or due to the transferring of the roof panel from its use position into its out-of-service position, the control cam can make contact with the control surface of the control element, and glide along the control surface. This displaces the control element, particularly pushes the same, and displaces the tension means accordingly for the displacement of the portion.

By means of the provision of a control element with a control surface, a larger movement stroke of the tension means can be achieved than is the case in a traditional mounting of the tension means on a link. Thus, such portions may also be displaced that are supported on a dimensionally stable support element, as has been described above, even when large displacement paths or strokes are necessary of the tension means in order to pivot the support elements.

However, the invention is not exclusively based on a displacement of pivoting support elements, but can also be used in any convertible top sections of a roof structure that can be displaced. In addition to the portions of a headliner that can be displaced as described above that can be displaced between a covering out-of-service position and a releasing working position, convertible top sections may also be displaced by means of the connection of a tension means to the link according to the invention that must merely be stretched or tightened when the roof structure is opened, or closed.

BRIEF DESCRIPTION OF THE DRAWING

Further advantages of this invention are obvious from the following description of an embodiment illustrated in the drawings. Therein.

SPECIFIC DESCRIPTION

Figure 1:
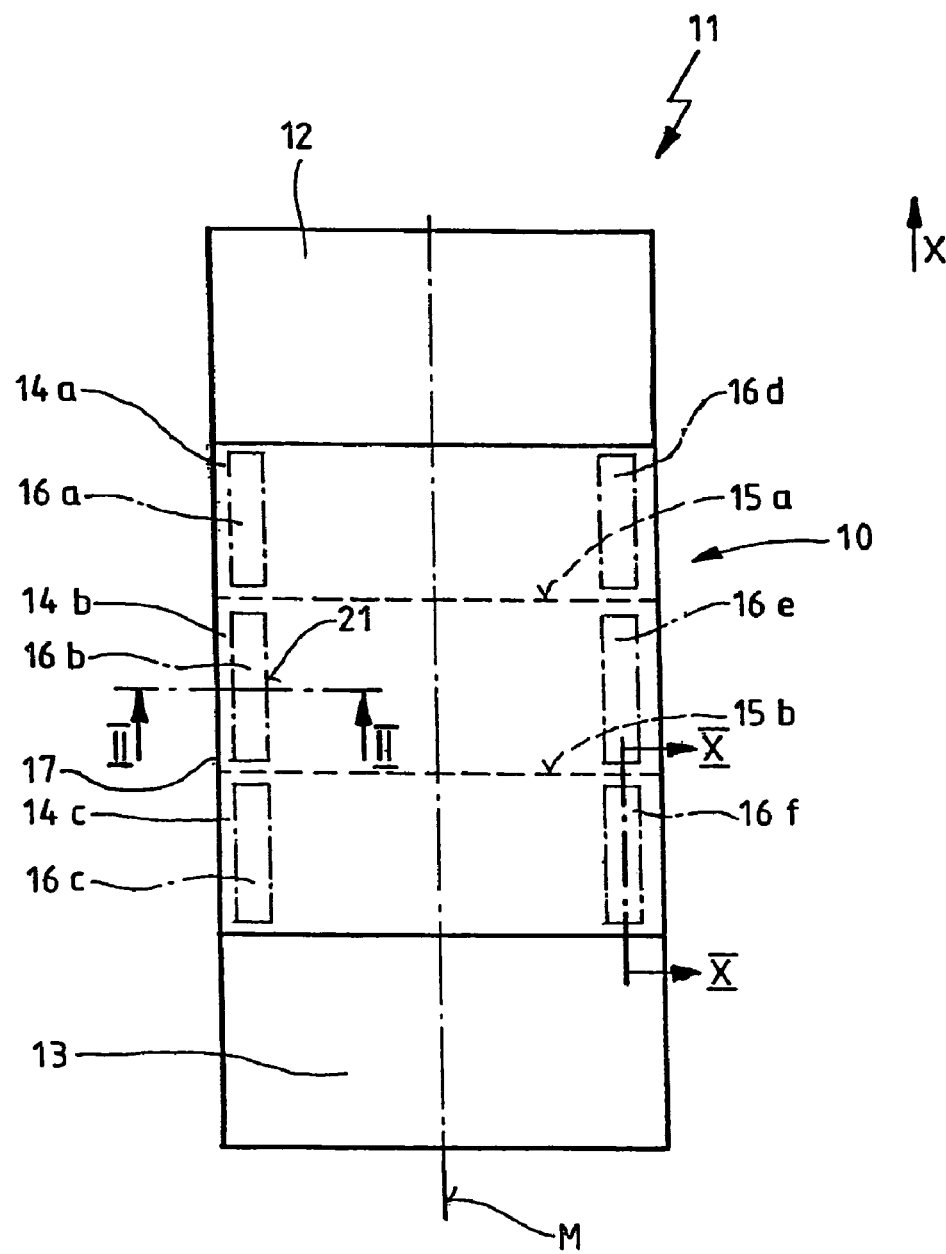
FIG. 1 shows a motor vehicle outlined in a schematic top view and having a roof structure according to the invention that is in its closed state and that comprises three roof panels.

For reasons of clarity the same references will be used for the same or comparable parts or elements of the roof structure in the following description of figures, partially by adding lower-case letters, insofar as differing embodiments are described, and also insofar as these explanations may refer to different aspects of the invention.

The roof structure designated in its entirety in the figures with 10 shall now be explained with reference to FIG. 1.

It shows in a schematic top view a motor vehicle 11, the travel direction of which is shown with x. A front hood 12 and a rear area 13 of the motor vehicle 11 are illustrated schematically. The roof structure 10 consists of three essentially dimensionally stable roof panels 14a, 14b, 14c, and is shown closed in FIG. 1. Located between the longitudinal edges of the essentially rectangular roof panels 14a, 14b, 14c are fold lines 15a, 15b forming pivot axes at which the roof panels 14a, 14b, 14c can be pivoted relative to each other by means of a linkage that is not shown in FIG. 1. In case the roof structure 10 is opened, the roof panels 14a, 14b, 14c are folded on top of one another, and are accommodated in the rear area 13 of the motor vehicle, such as in the trunk, in a compacted manner.

The cables of the linkage, which are not shown in FIG. 1, extend along with the links adjacent to or along outer side edges of the roof structure 10 in the travel direction x, i.e. adjacent motor-vehicle side walls 17. FIG. 1 shows support elements 16a, 16b, 16c, 16d, 16e, 16f that can cover or free the linkage. When viewing FIG. 1, the viewer should visualize the linkages arranged essentially along the support elements 16a, 16b, 16c, 16d, 16e, 16f.

Figure 2:
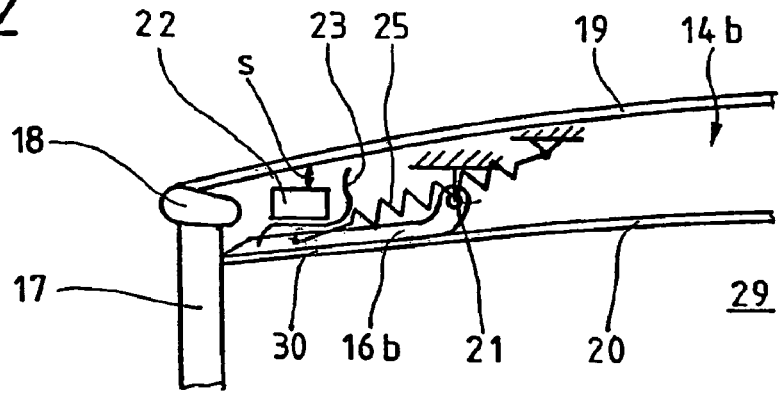
FIG. 2 shows a connection between the motor-vehicle side wall and the roof structure having a support element in a schematic partial sectional view approximately along section line II-II of FIG. 1.

FIG. 2 shows a very schematic, partial sectional view of the connection between the roof panel 14b of FIG. 1, and a motor-vehicle side wall 17 that is formed by a window, or by part of the body of the motor vehicle, such as also by a B- or C-column.

As shown in FIG. 2, the roof panel 14b has an outer skin 19 that is comprised, for example, of metal. The interior of the roof panel 14b is covered by a headliner 20, for example, of a flexible textile material, such as cloth or the like, so that the interior 29 of the motor vehicle 11 underneath the roof panel 14b is optically closed, the headliner 20 extending directly up to the side wall 17 of the motor vehicle.

FIG. 2 also shows the roof structure 10 in a closed position. The left edge area of the roof panel 14b as shown in FIG. 2 has a seal 18 that engages the motor-vehicle side wall, and safely seals against moisture in the closed position.

FIG. 2 shows a link 22 that is an integral part of a linkage that is not shown in detail. The link 22 is attached to the roof panel 14b in a manner not shown, preferably at a pivot, and may, as is obvious from the succession of movements of FIGS. 2 to 4, change its spacing from the roof outer skin 19 during an opening or a closing movement of the roof structure.

Figure 3:
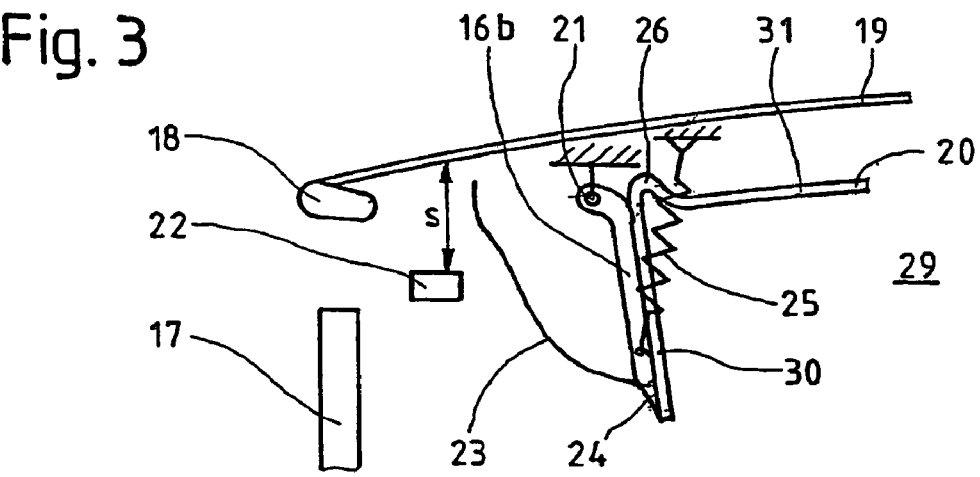
FIG. 3 shows the support element of FIG. 2 in an intermediate position in a view like FIG. 2.
Figure 4:
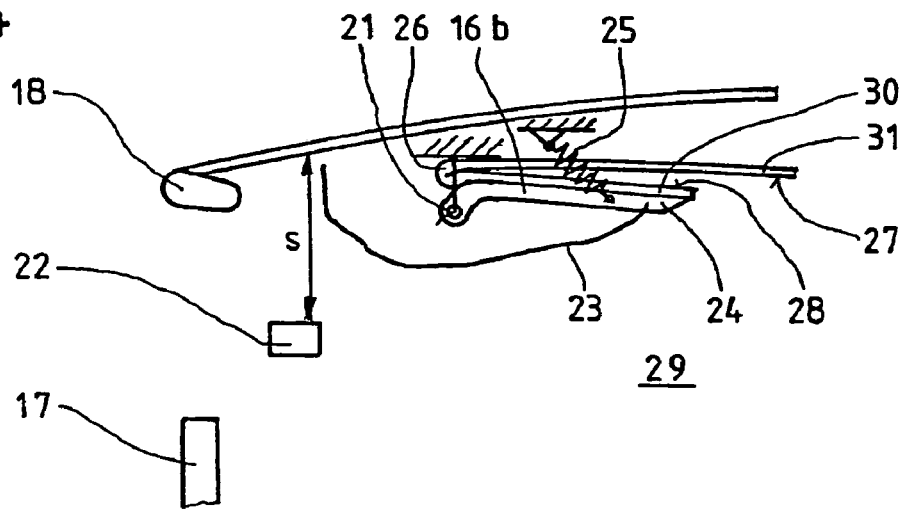
FIG. 4 shows the support element according to FIG. 2 in a releasing position in a view like FIG. 2.

It should be noted that the roof panel 14b in FIGS. 2 to 4 is shown only schematically. The roof panel 14b can, for example, be formed as a shell, and may comprise various reinforcing parts or elements that are not shown, such as ribs, or the like. The roof panel 14b may also be a sandwich of several layers and elements.

A support element 16b is pivotal around a pivot axis 21 fixed on the respective roof panel 14b and can be pivoted between an out-of-service position shown in FIG. 2 and a working position shown in FIG. 4, i.e. essentially across a pivot arc of approximately 180°. FIG. 3 shows an intermediate position.

As shown in FIG. 1, the support element 16b has a relatively large surface and is formed by a relatively flat body, such as a shell lying on a plane and consisting of, for example, plastic. It may particularly be formed essentially dimensionally stable. A portion 30 of the headliner 20 is attached to the support element 16b, for example, glued onto it. As FIG. 2 shows, the headliner 20 is therefore formed along the bottom of the roof panel 14b essentially in a continuous manner when viewed from the passenger compartment.

Pivoting of the support element 16b starting from a position according to FIG. 2 counterclockwise around the pivot axis 21 forms a fold 26 in the headliner 20. After completed pivoting of the support headliner 16b according to FIG. 4 an inner face 28 of the portion 30 and the respective inner face 27 of a section 31 of the headliner 20 adjacent to the support headliner 16b can be folded against each other, and can at least nearly touch and contact each other.

At a free end 24 of the support element 16b a tension element 23, such as in the form of a cable, engages. The other end of the cable not shown in the figures can be directly or indirectly connected to a link of the linkage, and can transmit movement of the linkage, or simultaneously also a movement of the roof panel 14b.

Finally, a spring element 25, such as a tension spring, is attached with its end on the roof panel, and with its other end on the support element 16b.

The mode of operation of the support element 16b and of the elements described above is as follows:

Based on a position according to FIG. 2, in which the roof structure 10 is closed, it should be assumed that opening of the roof structure is to be initiated in order to transform the motor vehicle 11 into a convertible. To this end, the roof panels 14a, 14b, and 14c must be pivoted relative to each other and must execute relatively complicated movements.

In the closed position according to FIG. 2, the portion 30 of the headliner 20 covers the link 22 of the linkage in order to thereby form a sealed transition between the roof panel 14b and the motor-vehicle side wall 17. This enables leak tightness against moisture and noise, as well as against temperature. An optically neat seal is also desirable.

According to FIG. 2 the support element 16b is in a pivoted-out position in which it deploys the portion 30 completely covering the linkage 22 so that the motor-vehicle passengers located in the interior 29 are not able to see the linkage 22. To this end, the spring 25 can be located, for example, in a position beyond the toggle point as in FIG. 2 so that this position of the support element 16b according to FIG. 2 is stable. A clockwise displacement of the support element 16b can be prevented for a position of the support element according to FIG. 2 by means of a limit stop that is not shown.

With the beginning of the opening movement of the roof structure 10 it may be necessary that the link element 22 passes through quite a large stroke, i.e. that the distances between the outer skin 19 of the roof panel 14b and the link 22 can be increased quickly. To this end it is necessary that the support element 16b quickly moves the link element 22 out of the way.

Freeing may occur, for example, in that the link element 22 directly contacts the support element 16b on its side facing the roof skin 19, and slightly pushes it away. As soon as the support element 16b has experienced a slight pivoting counterclockwise, for example, around a pivot angle of say 20°, the tension spring 25 can now independently pivot the support element 16b further along due to the modified direction of force, and finally transfer it into its final position according to FIG. 4, in which the support element 16b and the portion 30 are completely moved out of the movement path of the link element 22.

The link element 22 can then move further without the support element 16b getting in the way of the link element 22. The support element 16b is safely held in the of FIG. 4, and is compacted together. Any additional moving parts of the linkage can also be placed near the support element 16b during the subsequent further opening movement of the roof structure 10 without having to fear contact with the support element 16b and without subjecting the surfaces 27 and 28 of the headliner 20 to the possibility of getting dirty.

In case the roof structure is again to be returned from its opened out-of-service position into its closed use position, the tension means 23 can transmit movement of an element of the steering linage or of the roof panels 14a, 14b, 14c such that the support element 16*b* is pivoted from the position according to FIG. 4 clockwise around the pivot axis 21 back into a position according to FIG. 2.

Finally, the possibility also exists that the tension means 23 can be used contrary to what is shown in the figures to ensure that at the start of an opening movement of the roof structure 10 the support element 16*b* efficiently frees the link element 22. In this case the tension means 23 directly or indirectly engages the linkage in order to shift the support element 16*b* from its covered out-of-service position into its releasing working position. Return of the support element 16*b* from its working position according to FIG. 4 into its out-of-service position according to FIG. 2 may also occur via the tension means 23 with a suitable transfer of movement from the linkage.

Finally, the possibility also exists of utilizing two tension means in the form of linkages, cords, or the like, instead of a spring element 25 as shown in the figures that ensure a back and forth movement of the support element 16*b*.

Further, the possibility also exists that one tension means or several tension means engage a support element, and that in addition one spring element or several spring elements are provided that support the desired displacement movement of the support element.

Finally, the spring 25 of the support element 16*b* can be pretensioned into a covered out-of-service position, and not into a releasing position according to FIG. 4. In such a case the tension means 23 serves only for displacement of the support element from its covering into its releasing position in a manner not shown, the spring element 25 ensuring the return.

It should finally be noted that the illustrations of the tension spring element 25 chosen in FIGS. 2 to 4 are to be understood merely in a schematic manner, since contrary to the illustrations of FIGS. 3 and 4 the spring element 25 certainly does not pass through the headliner 20, but a different geometric arrangement is actually selected. FIGS. 2 to 4 merely clarify the mode of operation of the support element 16*b*.

One possibility is to replace the spring element 25 with a spiral torque spring that is mounted at the pivot axis 21 of the support element. Other springs may also be used, such as flat springs, torsion springs, or the like.

Figure 5:
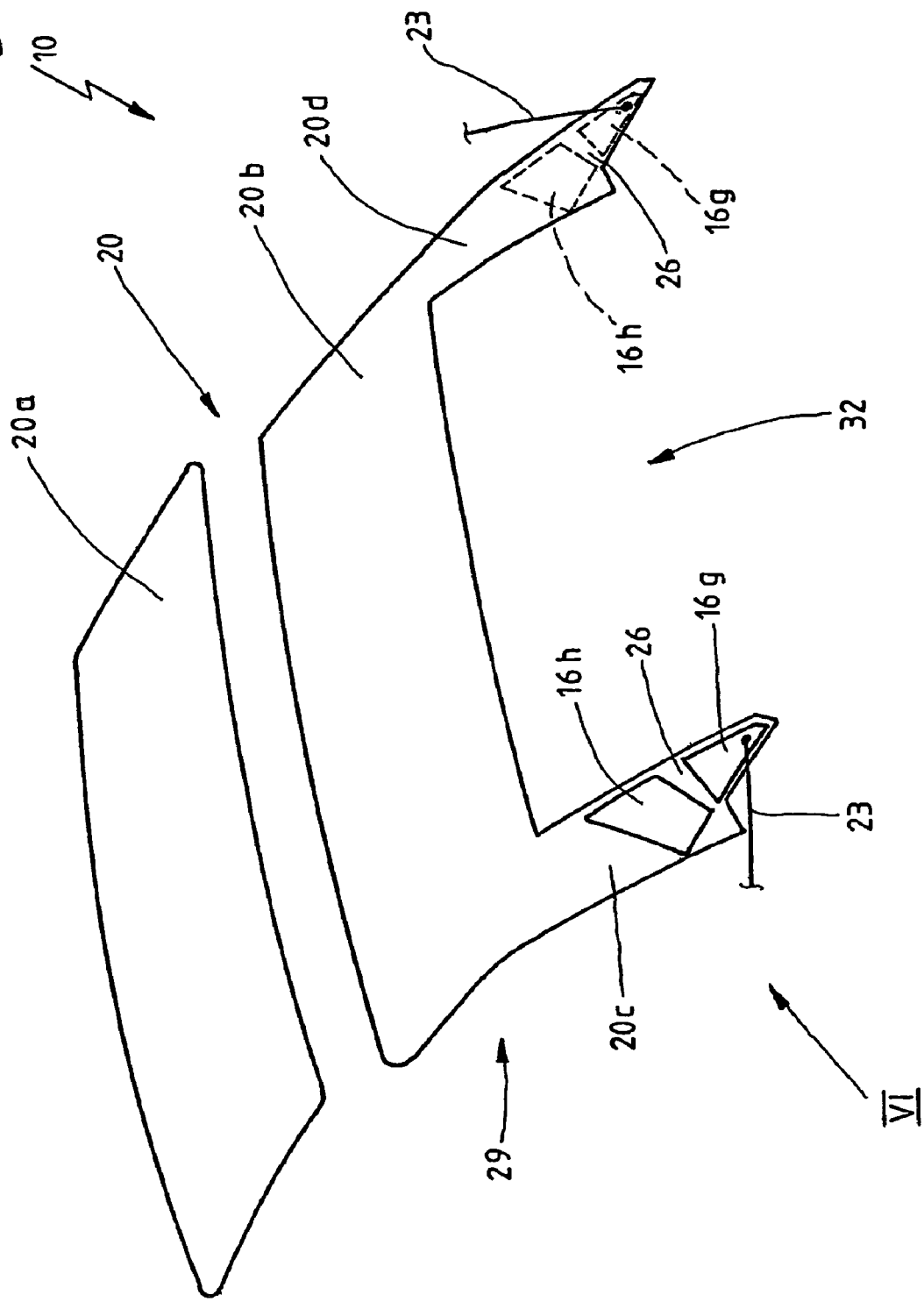
FIG. 5 shows only the headliner of a roof structure of a motor vehicle, such as a roof structure according to FIG. 1 in a schematic perspective view.

FIG. 5 shows a very schematic, perspective view of a headliner 20 in a single view, comprising a first headliner part 20*a* and a second headliner part 20*b*. The first headliner part 20*a* is arranged, for example, underneath the roof panel shown at 14*a* in FIG. 1. The headliner element 20*b* in FIG. 5 could be arranged, for example, underneath the roof panel shown at 14*b* in FIG. 1. The roof panel shown at 14*c* in FIG. 1 could have, for example, a transparent rear window, for which a cutout 32 is shown in the headliner 20 according to FIG. 5, the rear window itself not being shown in FIG. 5. The headliner sections 20*c* and 20*d* laterally flanking this recess 32 serve in the embodiment according to FIG. 5, for example, to cover the C-columns of the motor vehicle located in the area of the roof panel denoted as 14*c* in FIG. 1, but not shown, on its side facing the passenger compartment 29.

Sections 20*c* and 20*d* of the headliner are formed as longitudinal extensions. On their sides facing away from the motor-vehicle passenger compartment 29, the sections 20*c* and 20*d* each have a first support element 16*g* and a second support element 16*h*. The support elements 16*g* and 16*h* are, like the support elements 16*a* to 16*g* described above, essentially dimensionally stable planar elements that may, for example, consist of plastic, and that are laminated with the headliner cloth.

At each free end of the first support element 16*g* a tension means 23, particularly a cable, engages that is connected to a link of the linkage in a manner that is not shown.

In the devices according to the prior art, the entire covering of the C-column of the motor vehicle with a closed roof represented substantial problems. To this end, different shiftable support elements have been provided that, however, require a quite complex cam control.

Figure 6:
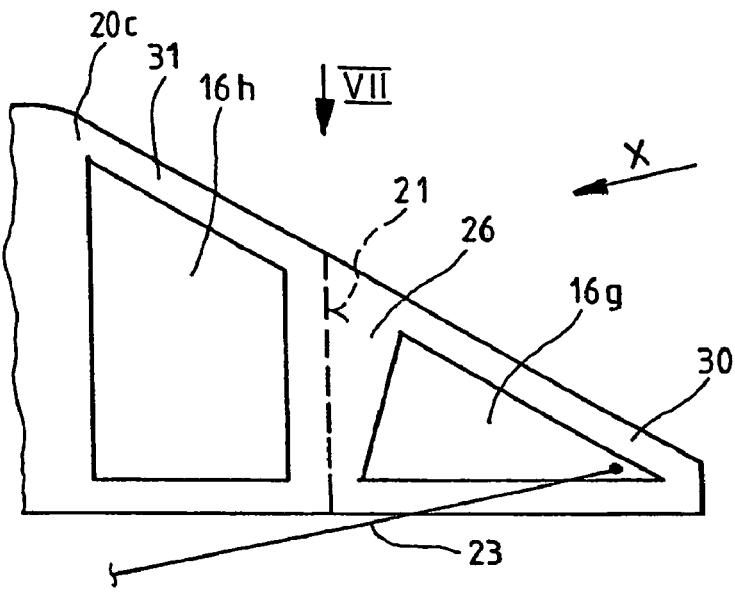
FIG. 6 shows an enlarged section of a free edge area of the headliner according to FIG. 5 in a schematic view, approximately according to view arrow VI of FIG. 5.

With the solution according to the invention the ability to tilt or fold the first support element 16*g* relative to the second support element 16*h* can be achieved in a manner that will be described below, particularly with reference to FIGS. 6 to 9:

FIG. 6 shows in a schematic top view the headliner section 20*c* of FIG. 5. It is obvious that a first essentially triangular support element 16*g*, and a second essentially trapezoidal support element 16*h* that is directly adjacent to it are provided. Between the two support elements 16*g* and 16*h* is a cloth fold portion 26 of the headliner 20. This section of the portion 26 advantageously forms the pivot axis 21 for a pivotal displacement of the first support element 16*g* relative to the second support element 16*h*.

The tension means 23 engages into an area of the right lower free end of the support element 16*g*. The other end of the tension means 23 that is not shown can cooperate with an element of the linkage and ensure pivoting of the first support element 16*g*, for example, as follows: starting from an extended position of the first support element 16*g* according to FIG. 7, the portion 33 of the tension means 23 can, for example, initially be displaced in the direction of arrow Y, such as into the dashed-line position of the tension means 23 shown in FIG. 7. Subsequently, a force in the direction of arrow X of FIG. 7 can be exerted on the tension means 23, and the tension means 23 can exert torque on the first support element 16*g* so that it pivots relative to the second support element 16*h*, which is held in a manner not shown, into a final position according to FIG. 9 via an intermediate position according to FIG. 8. The folded-up position according to FIG. 1 enables a compact, i.e. space-saving and protected accommodation of the first support element 16*g* relative to the second support element 16*h*.

The actual displacement movements of the portion 33 of the tension means 23 and the different directions of force and forces exerted on the first support element 16*g* by the tension means 23 are subject to relative complicated considerations that are determined by the movements of the linkage, or by the movements of the roof panel, or the roof panels. To this end, the directions of force constantly change due to the displacement of the elements of the linkage. While in an extended position of the support elements 16*g* and 16*h* according to FIG. 7, in consideration of the directions of force, it must be ensured that the extended position is maintained with the roof closed, which can be achieved, for example, by means of additional tension means not shown in FIG. 7, such as linkages, or the like, it must also be ensured during an opening movement of the roof structure that the first support element 16*g* experiences an actual pivoting due to the force exerted by the tension means 23.

The portion 30 of the headliner 20*c* attached to the first support element 16*g* has a surface 27 that with a first support element 16*g* in a folded-up position can directly contact the surface 28 of the adjacent section 31 of the headliner 20*c*, or can at least be brought into close proximity thereto. In this manner a particularly protective, space-saving accommodation of the portion 30 is achieved during a displacement movement of the roof panel.

Figure 7:
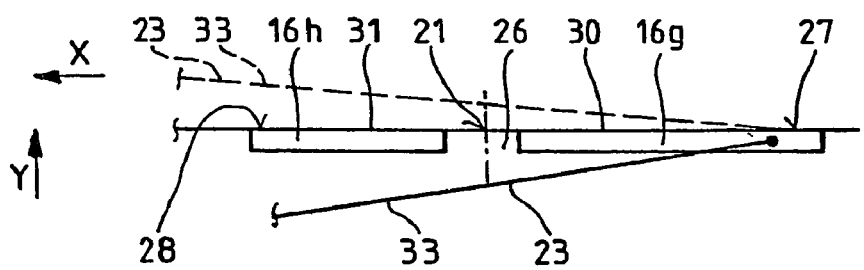
FIG. 7 shows a portion of the headliner in a top view according to view arrow VII in FIG. 6, having a support element located in an extended position.
Figure 8:
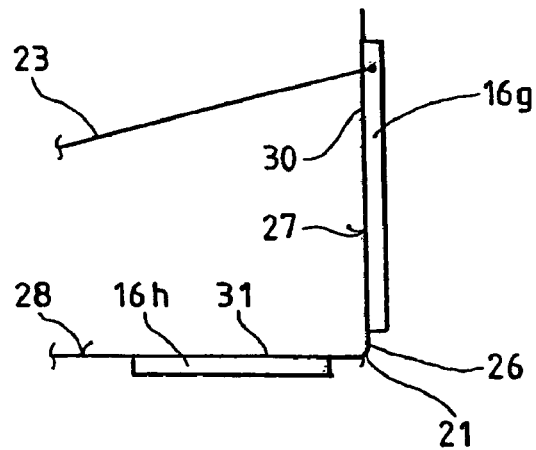
FIG. 8 shows the first support element in an intermediate position during pivoting in a view like FIG. 7.
Figure 9:
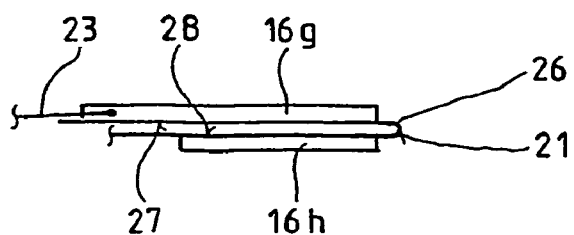
FIG. 9 shows the first support element in a folded-up position in a view like FIG. 7.

The C-column itself is not shown in FIGS. 5 to 9. The viewer should consider the location of the C-column, for example, underneath the support elements 16g and 16h shown in FIG. 7. A first support element 16g in an extended position can, for example, also together with the second support element 16h, rest against an interior of the C-column of a motor vehicle so that the extended position provides a stable final position. In any case, the tension means 23 can, as shown in FIG. 7, also ensure with a closed roof structure that the first support element 16g is in an extended position pretensioned against the C-column.

Figure 10:
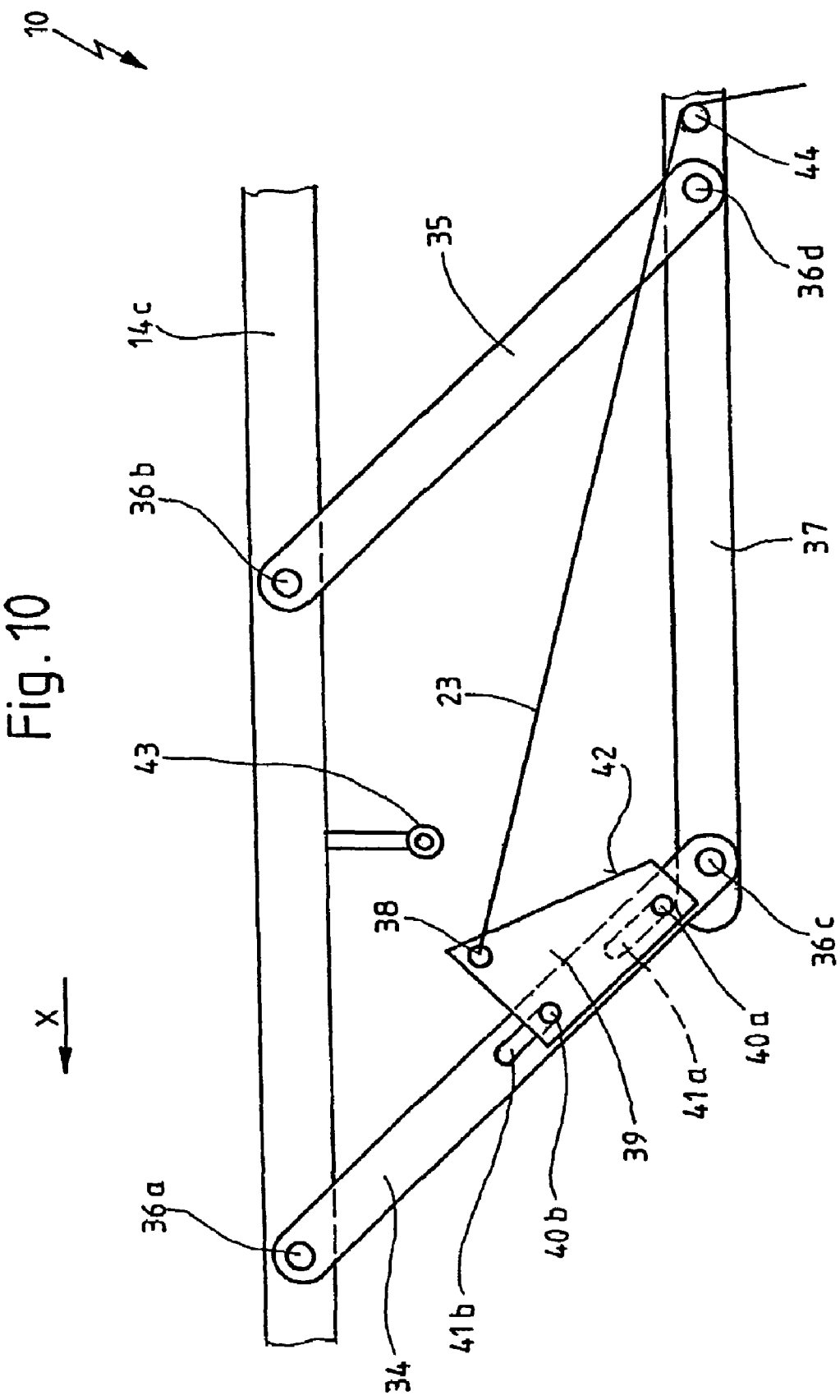
FIG. 10 shows a roof panel in a schematic partial sectional view approximately according to the section line X-X of FIG. 1, along with part of the linkage with two parallel links, a control element for a tension means being mounted on one of the links.

FIG. 10 shows in a very schematic view the roof panel 14c, approximately in a view like section line X-X in FIG. 1. The roof panel 14c can, for example, be formed by a roof shell or a sandwich structure. Neither the outer skin of the roof panel 14c nor the headliner 10 is shown in FIG. 10.

FIG. 10 shows a first link 34 and a second link 35 that pivotally interconnect the roof panel 14c via linkage pivots 36a, 36b, 36c, 36d to an additional element 37 of the linkage.

Figure 11:
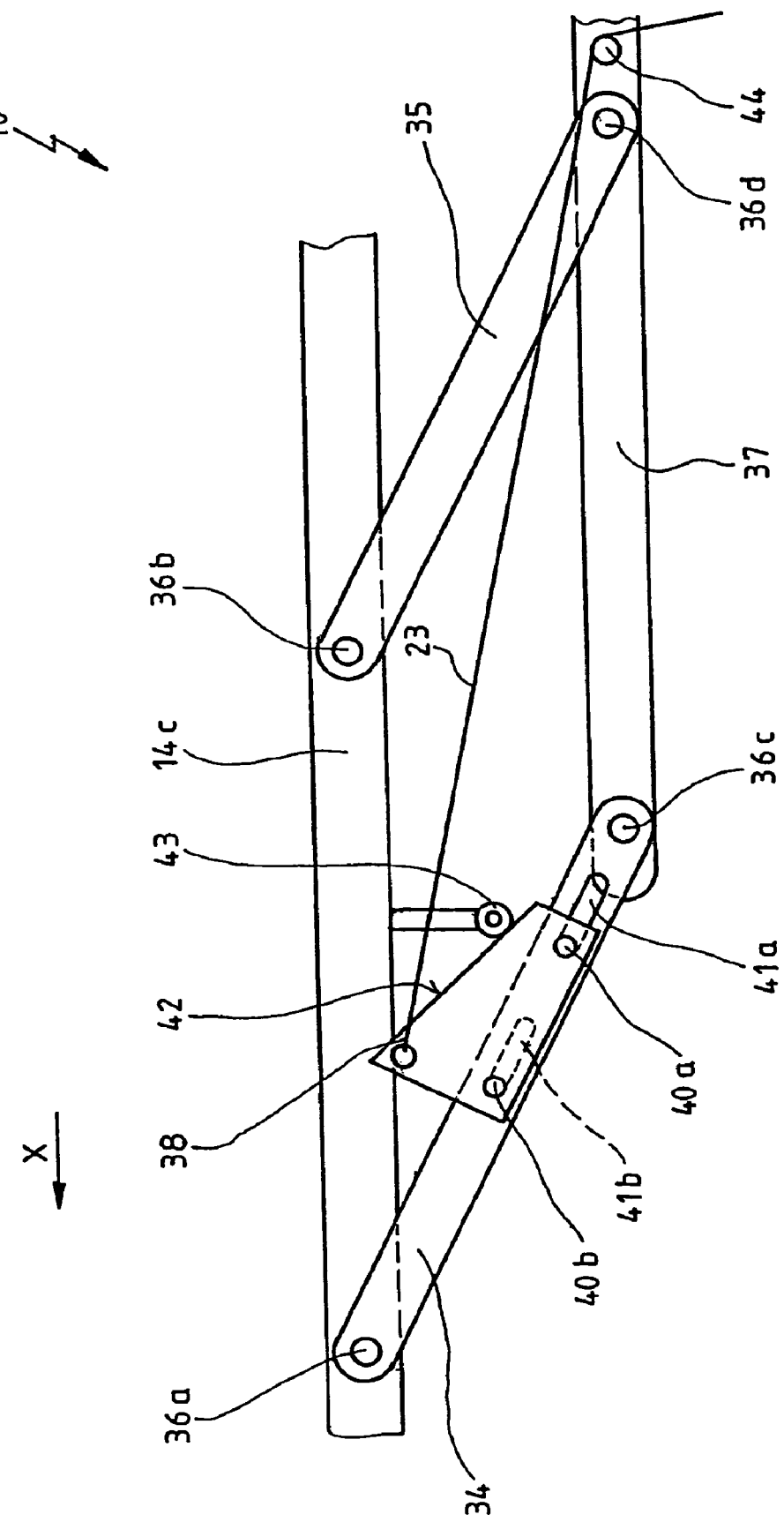
FIG. 11 shows the linkage in a modified position in a view like FIG. 10.

Due to a shifting of the roof panel 14c from its closed position, which could be shown, for example, by FIG. 1, into an open position of the roof structure 10 that is not shown, it should be assumed as follows that the roof panel 14c moves toward the component 37 due to a parallel pivoting, and an intermediate position is reached, for example, that is shown in FIG. 11.

With roof structures according to the prior art the free end 38 of the tension means 23 is typically directly attached to one of the links 34 or 35, or to another component 37, possibly also directly attached to the roof panel 14c of the roof structure 10. According to the invention the free end 38 of the tension 23 is now only attached to a control element 39 that is slidable between two shown end positions according to FIGS. 10 and 11 along the longitudinal extension of the link element 34.

The control element 39 has two merely schematically shown pins 40a and 40b that are guided in the respective link grooves 41a and 41b of the link element 34 so that the control element 39 is fixed to the link 34.

The control element 39 has a control surface 42 that can be contacted by a control cam 43. The control cam 43 is formed in the embodiment by a rotatable roller that is firmly mounted on the roof panel 14c.

Based on a position according to FIG. 10 the cam 43 is at a spacing from the control surface 42, such as with a completely closed roof structure according to FIG. 1. If there is relative movement between the link 34 and the roof panel 14c due to a shifting of the roof panel 14c from its use position into an out-of-service position, the roller 43 contacts the control surface 42 during the movement, and glides along the control surface 42 during further displacement of the roof panel 14c. To this end, the control element 39 that is thereby formed as a carriage, is displaced into the end position of FIG. 11, based on the link element 34.

With a displacement movement of the control element 39 the end 38 of the tension means 23 is also accordingly displaced. The other end of the tension means 23 not shown in FIGS. 10 and 11 that engages, for example, according to FIGS. 2 to 4, or 6 to 9, at a displaceable portion 30, or at the support element 16g or 16b carrying the same, possibly also over deflection rollers 44, is therefore also displaced by the same stroke.

By means of the arrangement of a control element 39 according to FIGS. 10 and 11 a large displacement path of the tension means 23 can be achieved, even if the relative movements, such as those of the cam element 43, are only minor. The control element 39 thereby transfers the available strokes and movement into the desired or required, possibly larger, strokes in the manner of a gear, such as is necessary, for example, for the folding or tilting of a support element 16b, 16g for a portion 30 of the headliner 20.

In the embodiment according to FIG. 1 the roof structure 10 is composed of three essentially dimensionally stable roof panels 14a, 14b, 14c. However, the invention can equally be employed in other roof structures having any desired number of roof panels.

FIG. 5 shows a two-part headliner 20 by means of example that is composed of a first part 20a, and a second part, the second part consisting of the sections 20b, 20c, and 20d. The number of parts of which the headliner 20 is composed typically depends on the number of roof panels, and corresponds to this number. The invention may also be used independently of the number of individual components, of which the headliner 20 or a roof cover is composed.

The invention claimed is:

1. A roof structure for motor vehicles, the roof structure comprising
at least one roof panel attached to the body of the motor vehicle,
a headliner,
linkage means for shifting the roof panel from an out-of-service position into a use position, and
at least one support element carrying a portion of the headliner for displacement between an out-of-service end position and a working end position, the headliner portion in the respective out-of-service end position covering a motor-vehicle portion and the headliner portion in the working position freeing the motor-vehicle portion, the support element being pivotal to displace the portion about a pivot axis fixed relative to the roof panel.

2. The roof structure according to claim 1 wherein the headliner has directly adjacent to the support element a section attached to the portion.

3. The roof structure according to claim 2 wherein the section of the headliner is mounted on a second support element.

4. The roof structure according to claim 2 wherein the section of the headliner is separated from the headliner portion by a fold.

5. The roof structure according to claim 2 wherein the headliner portion can be folded by pivoting of the support element in a direction toward the adjacent section of the headliner.

6. The roof structure according to claim 1 wherein the pivot axis is directly fixed on the roof panel.

7. The roof structure according to claim 1 wherein the pivot axis is provided on a component that is fixed relative to the roof panel.

8. The roof structure according to claim 1 wherein the support element is formed by a generally planar body.

9. The roof structure according to claim 8 wherein the body extends essentially along a plane.

10. The roof structure according to claim 8 wherein the body is essentially dimensionally stable.

11. The roof structure according to claim 1 wherein the support element can pivot more than 60°.

12. The roof structure according to claim 1 wherein the pivot axis extends generally in a travel direction of the motor vehicle.

13. The roof structure according to claim 1 wherein several of the pivoting support elements are provided.

14. The roof structure according to claim 13 wherein the roof structure has several of the roof panels that move relative to each other, respective pivoting support elements being provided on different roof panels.

15. The roof structure according to claim 14 wherein pivot axes of the support elements of different roof panels are aligned differently.

16. The roof structure according to claim 1 wherein the pivot axes of the support elements of each roof panel are aligned symmetrically to a vehicle center.

17. The roof structure according to claim 1 wherein the support element is pretensioned by a spring toward one of the two respective end positions.

18. The roof structure according to claim 17 wherein a tension means engages the support element.

19. The roof structure according to claim 18 wherein the support element can be returned by the tension means into the other respective end position.

20. The roof structure according to claim 18 wherein the tension means converts movement of the roof panel or of the linkage means into pivoting of the support element.

21. The roof structure according to claim 1 wherein pivoting of the support element is associated with displacement of the roof panel.

22. A roof structure for motor vehicles, the roof structure comprising:
    at least one roof panel attached to the body of the motor vehicle,
    a headliner,
    linkage means for shifting the roof panel from a out-of-service position into a use position, and
    at least one first support element carrying a portion of the headliner for displacement between an out-of-service end position and a working end position, the headliner portion in the respective out-of-service end position covering a motor-vehicle portion and the headliner portion in the working position freeing the motor-vehicle portion, the first support element being pivotal about a pivot axis to displace the portion between an extended position in which the portion along with an adjacent section of the interior headliner presents a large surface aligned essentially along a plane and a folded-up position in which the portion is folded onto the adjacent section.

23. The roof structure according to claim 22, further comprising
    a second support element carrying the adjacent section of the interior headliner.

24. The roof structure according to claim 23 wherein the second support element maintains its position relative to the roof panel during opening or closing of the roof panel.

25. The roof structure according to claim 23 wherein the second support element changes its position relative to the roof panel during opening or closing of the roof panel.

26. The roof structure according to claim 22 wherein a fold of the interior headliner is between the first and the second support elements.

27. The roof structure according to claim 26 wherein the pivot axis is at the fold.

28. The roof structure according to claim 22 wherein the pivot axis is essentially perpendicular relative to a floor of the motor vehicle.

29. The roof structure according to claim 22, further comprising
    tension means engaging the first support element.

30. The roof structure according to claim 29 wherein the tension means displaces the first support element between the respective end positions.

31. The roof structure according to claim 22 wherein displacement of the first support element is associated with opening or closing of the roof panel or of the linkage.

32. The roof structure according to claim 22 wherein the first support element is formed by a generally planar body.

33. The roof structure according to claim 32 wherein the body extends essentially along a plane.

34. The roof structure according to claim 32 wherein the body is formed essentially dimensionally stable.

35. The roof structure according to claim 22 wherein the first support element can be pivoted by about 180°.

36. A roof structure for motor vehicles, the roof structure comprising
    at least one roof panel attached to the body of the motor vehicle,
    an interior headliner,
    linkage means for shifting the roof panel from an out-of-service position into a use position, the linkage means including a link and a control element shiftable relative to the link,
    tension means for shifting a portion of the roof panel between an out-of-service position and a working position, the tension means engaging the link of the linkage so that a movement of the link is associated with a displacement of the roof-panel portion, the control element cooperating with the tension means and having a control surface, the control element being displaceable relative to the link on movement of the link by contact of a control cam with the control surface.

37. The roof structure according to claim 36 wherein the control element can be displaced relative to the link.

38. The roof structure according to claim 36 wherein the control cam is an integral part of the roof structure.

39. The roof structure according to claim 38 wherein the control cam is arranged on the roof panel.

40. The roof structure according to claim 38 wherein the control cam is formed by a rotating roller.

41. The roof structure according to claim 38 wherein the control cam glides along the control surface due to movement of the roof panel from its out-of-service position into its use position, or due to movement of the roof panel from its use position into its out-of-service position.

* * * * *